United States Patent
Kupershtok et al.

(10) Patent No.: US 9,734,458 B2
(45) Date of Patent: Aug. 15, 2017

(54) PREDICTING OUTCOME BASED ON INPUT

(71) Applicant: International Business Machines Corporation, Armonk, NY (US)

(72) Inventors: Aharon Kupershtok, Ramat Gan (IL); Yaakov Yaari, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 14/262,825

(22) Filed: Apr. 28, 2014

(65) Prior Publication Data

US 2015/0310332 A1  Oct. 29, 2015

(51) Int. Cl.
G06F 9/45 (2006.01)
G06N 99/00 (2010.01)
G06F 11/00 (2006.01)
G06F 9/44 (2006.01)

(52) U.S. Cl.
CPC ............. *G06N 99/005* (2013.01); *G06F 8/70* (2013.01); *G06F 8/75* (2013.01); *G06F 11/00* (2013.01)

(58) Field of Classification Search
CPC .................................................... G06N 99/00
See application file for complete search history.

(56) References Cited

U.S. PATENT DOCUMENTS

| | | | |
|---|---|---|---|
| 7,484,132 B2 | 1/2009 | Garbow | |
| 7,730,364 B2 | 6/2010 | Chang et al. | |
| 7,877,645 B2 | 1/2011 | Meyer et al. | |
| 8,291,264 B2 | 10/2012 | Scholer et al. | |
| 2004/0168108 A1 | 8/2004 | Chan et al. | |

OTHER PUBLICATIONS

I. Gondra, "Applying machine learning to software fault-proneness prediction", J. Sys. and Software 81, 2008, pp. 186-195.*
S. Dey and J.A. Sotri, "A Bayesian network approach to root cause diagnosis of process variations", Int'l J. of Mach. Tools & Manufacture 45, 2005, pp. 75-91.*
M. Ducasse, "A pragmatic survey of automated debugging", in Int'l Workshop on Automated and Algorithmic Debugging, May 1993, 15 pages.*
Beszedes et al., "Predicting critical problems from execution logs of a large-scale software system", Proceedings of the 11th Symposium on Programming Languages and Software Tools and 7th Nordic Workshop on Model Driven Software Engineering (SPLST'09), Aug. 2009, 12 pages.

(Continued)

*Primary Examiner* — Vincent Gonzales
(74) *Attorney, Agent, or Firm* — Ziu Glazberg

(57) ABSTRACT

A method, system and product for predicting an outcome of a program based on input. The method comprising: obtaining an input to be used by a program prior to executing the program; predicting by, a machine learning module, a predicted outcome of the program based on the input; wherein the predicted outcome is selected from the group consisting of: a pass outcome and a fail outcome, wherein the pass outcome is the program executing without failing when using the input, and wherein the fail outcome is the program failing when using the input.

19 Claims, 3 Drawing Sheets

(56) References Cited

OTHER PUBLICATIONS

Pezze Mauro, "Run-Time Model Projections for Software Failure Prediction", A Universita della Svizzera Italiana Faculty of Informatics Project, Start date Jan. 1, 2013, 1 page. Can be found at: http://search.usi.ch/projects/604/Run-time-Model-Projections-for-Software-Failure-Prediction.
Bishnu et al., "Software Fault Prediction Using Quad Tree-Based K-Means Clustering Algorithm", IEEE Transactions on Knowledge and Data Engineering, vol. 24 , Issue: 6, Jun. 2012, pp. 1146-1150.
Ahmed E. Hassan, "Predicting Faults Using the Complexity of Code Changes", ICSE '09 Proceedings of the 31st International Conference on Software Engineering, May 2009, pp. 78-88.
Fulp et al., "Predicting Computer System Failures Using Support Vector Machines", WASL'08 Proceedings of the First USENIX conference on Analysis of system logs, 2008, 8 pages.

\* cited by examiner

PREDICTING OUTCOME BASED ON INPUT

TECHNICAL FIELD

The present disclosure relates to machine learning in general, and to predicting an outcome of an executable program, in particular.

BACKGROUND

A known fact of life is that any software program may always have bugs. Even newly deployed software programs may experience failures related to the program and the input data it is processing. Hence, certain type of inputs can influence the outcome of any software program and may even cause it to crash. This problem exists even if the program has undergone rigorous testing. Failure of the program may be particularly problematic for mission critical software, such as spacecraft navigation program or programs monitoring processes in a nuclear reactor. Furthermore, input dependent failure may dramatically impact programs that require high availability, such as web servers and intranet servers (e.g., banking database).

Comprehensive testing can't possibly cover all scenarios that may emerge during the practical use of the program. Therefore, testing alone cannot ensure that the software will not fail when executed with certain input.

In addition a programmer may assume certain input structures. The assumptions may be valid at the time the program was developed or deployed. However, over the years the assumptions may not longer be valid and as a result the program may fail. As an example, consider a server for executing EXE files. The server may have been developed when 32-bit EXE files were used exclusively. However, over the years, 64-bit machines have been developed and accordingly there are 64-bit EXE files that may be provided to the server as input. The assumption, therefore, is no longer correct and the server may potentially fail due to the unexpected input

BRIEF SUMMARY

One exemplary embodiment of the disclosed subject matter is a computer-implemented method, comprising: obtaining an input to be used by a program prior to executing the program; predicting by, a machine learning module, a predicted outcome of the program based on the input, wherein the predicting is performed by a processor; wherein the predicted outcome is selected from the group consisting of: a pass outcome and a fail outcome, wherein the pass outcome is the program executing without failing when using the input, and wherein the fail outcome is the program failing when using the input.

Another exemplary embodiment of the disclosed subject matter is A computerized apparatus having a processor, the processor being adapted to perform the steps of: obtaining an input to be used by a program prior to executing the program; predicting by, a machine learning module, a predicted outcome of the program based on the input, wherein the predicted outcome is selected from the group consisting of: a pass outcome and a fail outcome, wherein the pass outcome is the program executing without failing when using the input, and wherein the fail outcome is the program failing when using the input.

Yet another exemplary embodiment of the disclosed subject matter is a computer program product comprising a computer readable storage medium retaining program instructions, which program instructions when read by a processor, cause the processor to perform a method comprising: obtaining an input to be used by a program prior to executing the program; predicting by, a machine learning module, a predicted outcome of the program based on the input, wherein the predicted outcome is selected from the group consisting of: a pass outcome and a fail outcome, wherein the pass outcome is the program executing without failing when using the input, and wherein the fail outcome is the program failing when using the input.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
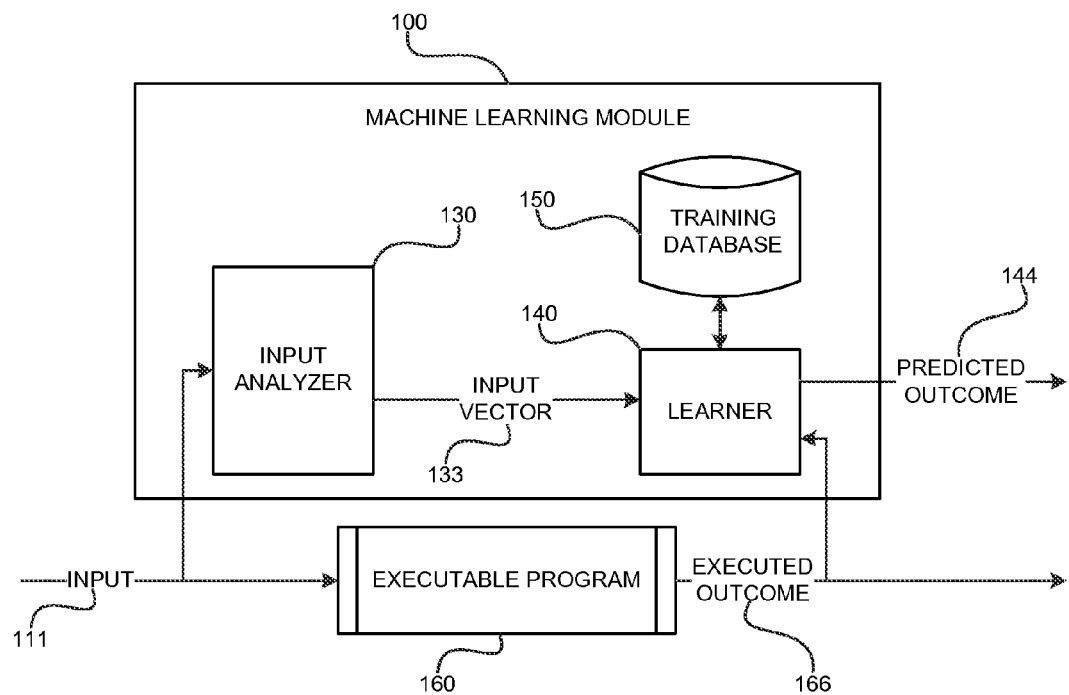
FIG. 1 shows a block diagram of a machine learning module, in accordance with some exemplary embodiments of the disclosed subject matter.

One technical problem dealt with by the disclosed subject matter is a to avoid failures of a program. The program may fail during execution, such as the program may crash, the program may attempt accessing restricted memory locations, the program may attempt dividing by zero, or the like. The failure may be caused due to the inputs provided to the program. In some cases, in case the program fails, it may be shutdown and not provide service until it is rebooted, such as in case of a software server. In some cases, recovering from a failure may take time. Additionally or alternatively, program failure may lead to a corrupted database, data lost, or the like, which may render recovery harder or even impossible. Therefore, avoiding potential program failures may be desired.

One technical solution is to predict the whether the program will fail prior to executing the program. In some exemplary embodiments, it may be predicted whether the program, when provided given input, is expected to fail (fail outcome) or succeed (pass outcome). In some exemplary embodiments, in case of a predicted fail outcome, execution of the program may be avoided, thus avoiding the failure.

In some exemplary embodiments, a message may be transmitted to a developer of the program to provide an indication of the predicted failure. In some exemplary embodiments, a subset of the inputs may be the cause of failure. The disclosed subject matter may identify the subset and provide the message to indicate the subset to the developer.

In some exemplary embodiments, a user using the program may be prompted to manually override the failure avoidance mechanism, such as in case the prediction is believed to be not relevant due to a software patch, or in case the user may like to debug the predicted failure.

In some exemplary embodiments, the disclosed subject matter may utilize a machine learning module to predict the outcome of the program. The machine learning module may implement any machine learning technique, such as supervised learning, decision tree learning, support vector machine, or the like.

Additionally or alternatively, the disclosed subject may be utilized by any computerized system that executes the program, such as for example, a server, a client connected to a network, a standalone computer, or the like.

One technical effect of utilizing the disclosed subject matter is to avoid execution of the program in cases that it is expected to fail thus avoiding the potential side-effects of the failure, such as corrupting data, loosing data, having the program being unavailable for additional processing, a combination thereof, or the like. In some exemplary embodiments, utilizing the disclosed subject matter may increase Mean Time Between Failures (MTBF) of the program, decrease downtime of the program, increase availability of the service provided by the program, or the like.

In some exemplary embodiments, by identifying the cause of failure and notifying developers, the disclosed subject matter may be useful in reducing debugging costs and in improving the program so as it may be not fail for realistic input that is provided to it when deployed in the field.

Referring now to FIG. 1 showing a block diagram of a Machine Learning Module (MLM) in accordance with some exemplary embodiments of the disclosed subject matter.

A Machine Learning Module (MLM) 100 may be a computerized device adapted to predict an outcome of an executable program, such as, an Executable Program (EP) 160. MLM 100 may be implemented using software, hardware, firmware, combination thereof, or the like.

In some exemplary embodiments, MLM 100 may comprise an Input Analyzer 130. Input Analyzer 130 may be utilized to obtain inputs, such as Input 111, about to be used by EP 160 prior to executing EP 160. In some exemplary embodiments, Input Analyzer 130 may be used to analyze Input 111 and produce a vector of attributes, such as, an Input Vector 133.

In some exemplary embodiments, the input may have different structures, such as for example, a structure of a TCP/IP packet-, an executable file structure (e.g., Linux ELF), a source program structure, a combination thereof, or the like. In some exemplary embodiments, Input Analyzer 130 may be configured to extract attributes from each input structure based on a scheme of the input structure. The extracted attributes may have known types, such as: a 32-bit integer, a string of characters, or the like. In some exemplary embodiments, The Input Vector 133 may comprise the extracted attributes to represent the input of EP 160 to a Learner 140. Additionally or alternatively, the input vector may comprise, at each cell, a different, logically separated, input as a different attribute.

In some exemplary embodiments, MLM 100 may comprise a Learner 140. Learner 140 may predict the outcome of EP 160, based on Input Vector 133. In some exemplary embodiments, a predicted outcome such as Predicted Outcome 144 may be either a pass outcome or a fail outcome, prior to executing EP 160. The pass outcome may indicate that EP 160 is predicted to execute without failing, when using the input. The fail outcome may indicate that EP 160 is predicted to fail during execution when using the input.

Additionally or alternatively, in the case of a predicted fail outcome, Learner 140 may identify a subset of the attributes of Input Vector 133 that is the cause of the fail prediction.

Additionally or alternatively, Learner 140 may be configured to output the subset of the attributes, such as by sending a message to a developer of EP 160 notifying about the predicted outcome of the predicted fail outcome. Additionally or alternatively, Learner 140 may communicate to a data repository, such as a Training Database 150, the Input Vector 133 and its associated outcomes, such as, Predicted Outcome 144 and/or an Executed Outcome 166.

In some exemplary embodiments, Learner 140 may be trained with respect to data retained in Training Database 150. In some exemplary embodiments, Training Database 150 may retain past execution outcomes, which may be used to train Leaner 140 to predict fail/pass outcomes of EP 160 based on inputs provided to EP 160.

In some exemplary embodiments, MLM 100 may comprise Training Database 150 that may store inputs and an associated outcome for each input. In some exemplary embodiments, Training Database 150 may retain records of pairs (vector, outcome). Additionally or alternatively, Training Database 150 may retain a representation for each attribute and its associated outcomes. In some exemplary embodiments, the representation of the attribute may comprise clusters of ranges; each cluster may be associated with different outcome. In some exemplary embodiments, the Input Vector 133 of EP 160, such as for example Linux ELF executable file, may have pass outcome cluster corresponding to executable files of 32-bit attribute and a different pass outcome cluster corresponding to executable files of 64 attribute. Additionally or alternatively, each cluster of pass or fail outcome may comprise a plurality of ranges, each range defines the values associated with the outcome of a specific attribute.

In some exemplary embodiments, $V=(\alpha_1, \alpha_2 \ldots \alpha_{n-1}, \alpha_n)$ may be an input vector, such as Input Vector 133, comprising n attributes.

In some exemplary embodiments, Learner 140 may retain two or more clusters for each attribute ($\alpha_i$). Each cluster may comprise one or more ranges of input values for one specific outcome. The following table shows an example of pass outcome cluster of attribute $\alpha_n$, where each range comprised in the cluster indicates a different range of input values that have pass outcome. As an example the values A-F may be a pass range, comprising values that are considered "safe". As another example, range 12-72 may also be a pass range. As yet another example, range K-M may be a fail range, comprising values that are estimated to cause a fail outcome when EP 160 is executed. In some exemplary embodiments, the pass and fail ranges may include only a sub-portion of the potential inputs. As an example, the values G and J may not be assigned to any range.

In accordance with some exemplary embodiments of the disclosed subject matter, EP 160 may be executed. EP 160 may be executed by a processor, such as Processor 302 of FIG. 3. In some exemplary embodiments, EP 160 may be executed only in case Learner 140 predicts a pass outcome. Additionally or alternatively, in case of a predicted fail outcome, a user may manually decide to execute EP 160 with the input after being informed of the predicted fail outcome. As an example, in case the prediction is based on a past execution outcome which is no longer relevant, the user may decide to allow execution. As another example, in case Learner 140 indicates that the value of attribute $\alpha_j$ is the cause of the predicted failure, the user may disregard such a warning in view of his knowledge that a patch was installed to correct an error relating to attribute $\alpha_j$, to the current value of $\alpha_j$, or the like.

In some exemplary embodiments, in case EP 160 is executed, an execution outcome, such as Execution Outcome 166, may be determined Execution Outcome 166 may be determined by Learner 140 or by another module monitoring execution of EP 160. In some exemplary embodiments, if EP 160 is executed over a predetermined amount of time, it may be assumed that EP 160 has encountered an infinite loop, which could be considered as a fail outcome. In some exemplary embodiments, Execution Outcome 166 may indicate either a pass outcome or a fail outcome. In some exemplary embodiments, Learner 140 may update the Training Database 150, in the event that the execution outcome is different than the predicted outcome.

Figure 2:
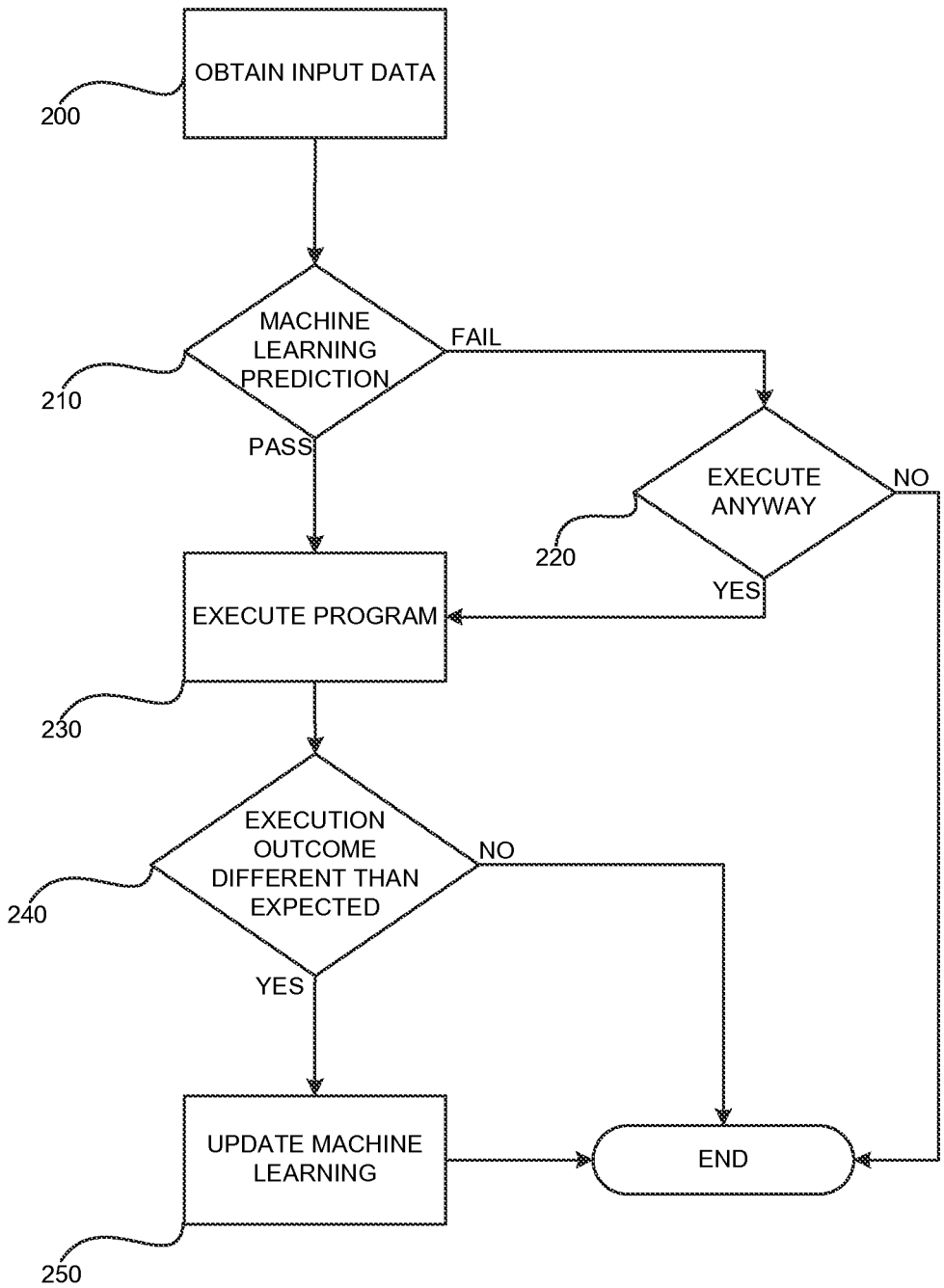
FIG. 2 shows a flowchart diagram of a method, in accordance with some exemplary embodiments of the disclosed subject matter.

Referring now to FIG. 2, showing a flowchart diagram of a method in accordance with some exemplary embodiments of the disclosed subject matter.

In Step 200, an input may be obtained. The input, such as Input Data 111 of FIG. 1, may be used for executing a program, such as EP 160 of FIG. 1. In some exemplary embodiments, input may be any computerized information, such as for example, executable files, compilers, a TCP/IP packet stream, database files, a combination thereof, or the like.

In Step 210, an outcome may be predicted. The outcome prediction of the execution of program when using the input may be performed by a machine learning module, such as MLM 100 of FIG. 1. In case of a prediction of a pass outcome, Step 230 may be performed. In case of a prediction of a fail outcome, Step 220 may be performed.

In some exemplary embodiments, in case of a prediction of fail outcome, a developer of the program may be notified of the predicted failure such as by sending a message to the developer. Additionally or alternatively, the message may be sent if the program is not executed (see Step 220 below) or if the program is executed and will fail, as predicted, thereby avoiding providing false negative indications of fail outcome that can be identified as such by the disclosed subject matter.

In Step 220, a determination whether to execute the program in spite of the fail prediction may be performed. In some exemplary embodiments, the default behavior may be to avoid execution of the program in case of a fail prediction. In some exemplary embodiments, the user may be notified of the fail prediction and may decide to execute the program. In some exemplary embodiments, upon receiving the fail outcome prediction, the user may instruct to execute the program. In some exemplary embodiments, the user may manually decide to avoid executing the program due to the fail outcome prediction.

Additionally or alternatively, avoiding the execution may be followed by outputting to a developer of the program, information associated with the fail outcome prediction. In some exemplary embodiments, the information may comprise a subset of attributes indicating a cause of the fail outcome. The subset of attributes may be attributes identified out of the vector of attributes, such as Input Vector 133, by Learner 140 as the cause of the fail outcome.

In Step 230, the program may be executed. In some exemplary embodiments, the program may be executed automatically following the pass outcome prediction. Additionally or alternatively, following the fail outcome prediction, the program may be executed in response to an instruction from the user or a determination to execute the program performed in Step 220. In some exemplary embodiments, an execution outcome, such as Execution Outcome 166, may be determined. The execution outcome may be indicating either a pass outcome or a fail outcome of the executed program.

In Step 240, the execution outcome may be compared to the predicted outcome. In some exemplary embodiments, an execution outcome that is equal to the predicted outcome may be referred to as an expected outcome. In some exemplary embodiments, an execution outcome that is different than the predicted outcome may be referred to as a conflicting outcome.

In some exemplary embodiments, in case the execution outcome is different than the predicted outcome, Step 250 may be performed.

In some exemplary embodiments, in case both the predicted and execution outcomes are fail outcomes, the disclosed subject matter may provide an output, such as described above with respect to Step 220. In some exemplary embodiments, duplicate outputs may be avoided, and therefore in case in Step 220 it is determined to execute the program in spite of the predicted fail outcome, the output may be delayed and provided in case the execution fails as predicted.

In Step 250, the machine learning module may be updated. In some exemplary embodiments, updating the machine learning module may be preformed by updating a data repository, such as Training Database 150 of FIG. 1, based on the input and the execution outcome.

In some exemplary embodiments, the data repository may comprise a fail outcome, associated with a given vector of attributes, such as Input Vector 133. In some exemplary embodiments, prior to executing the program, MLM 100 may predict a fail outcome based the content of the data repository. Following the fail outcome prediction, the user may execute the program despite the fail outcome prediction. In some exemplary embodiments, the executed outcome of the program may be a pass outcome. Such conflicting outcome may occur, for example, due to an upgrade preformed before executing the program. In some exemplary embodiments, the data repository may be updated to introduce as training data a record which indicates that the input is associated with a pass outcome. In some exemplary embodiments, updating the data repository may eliminate previous training data record (e.g., by modifying it, by substituting it, or the like) which indicates that the input is associated with a fail outcome. The previous training data record may reflect a past execution of the program, in which the input was provided and has failed. In some exemplary embodiments, the data repository may be updated to remove a plurality of training data records that reflect past executions of the program and that are in contradiction to the successful execution. As an example, consider the following scenario: the training data set may contain one data record that indicates that for $\alpha_i$="A", the outcome is a fail outcome. Another record may indicate that for $\alpha_j$="10", the outcome is a fail outcome. However, when an input in which $\alpha_i$="A" and $\alpha_j$="10" is provided to the program, the execution outcome is a pass outcome. In such a scenario, the two data records may be removed from the data repository to remove defunct information. The new outcome may be encoded into the data repository using one or more records. The disclosed subject matter may provide similar functionality when the predication is of a pass outcome and the execution fails.

In some exemplary embodiments, the program may have a deterministic outcome. That is to say that for the same input the program deterministically fails or passes. Therefore, the past execution data that is contradicted by current execution outcomes may be removed as no longer being relevant, such as due to a patch or a modification of the program.

In some exemplary embodiments, the program may have a deterministic outcome in view of the input it is provided. The input may include a pseudo-random seed used for pseudo random actions in the program which are deterministic given the same seed. Additionally or alternatively, in case of a multi-process or a multi-thread program, the input may comprise a scheduling of the processing entities thus rendering the program deterministic per the scheduling.

Figure 3:
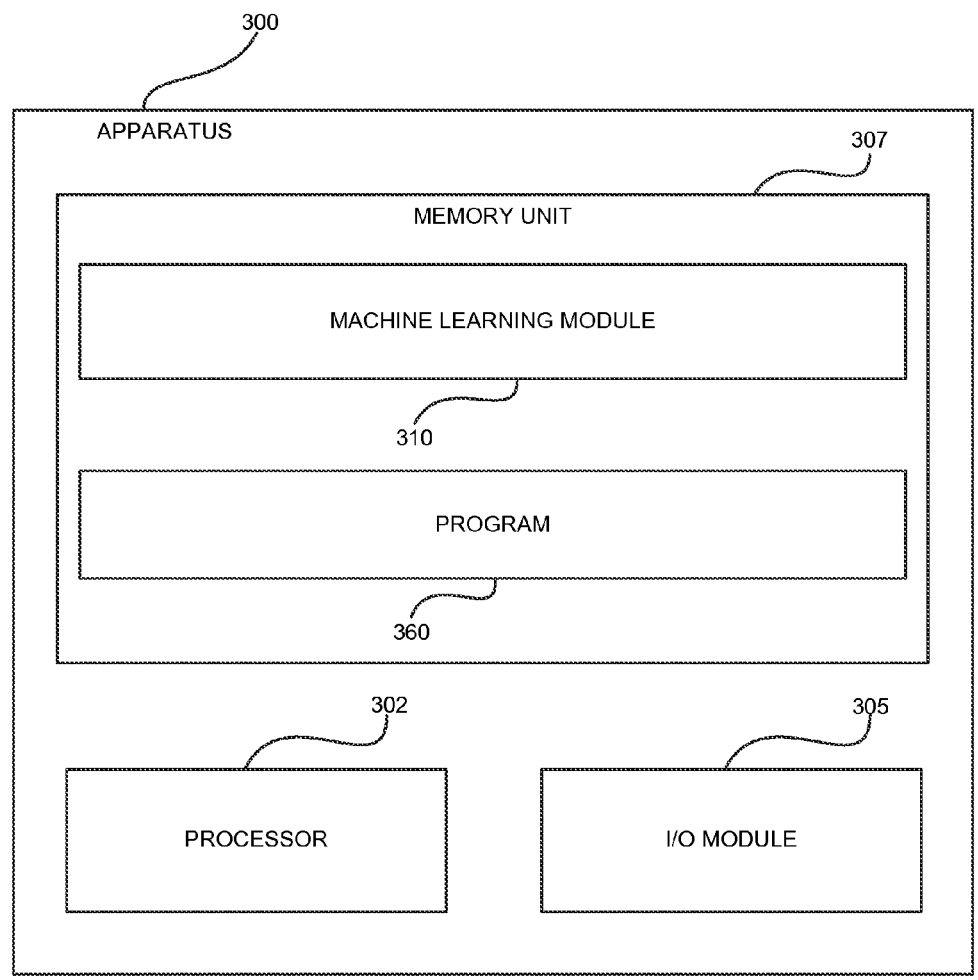
FIG. 3 shows a computerized environment in which the disclosed subject matter is used, in accordance with some exemplary embodiments of the subject matter.

Referring now to FIG. 3 showing a computerized environment in which the disclosed subject matter is used, in accordance with some exemplary embodiments of the subject matter.

An Apparatus 300 may be configured to predict an outcome of a program, to execute the program, to compare an executed outcome to a predicted outcome, to output a report describing the cause of a fail outcome, or the like. In some exemplary embodiments, Apparatus 300 may be configured to perform the steps of FIG. 2.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents. Processor 302 may be configured to perform the steps of the method of FIG. 2.

In some exemplary embodiments of the disclosed subject matter, Apparatus 300 may comprise an Input/Output (I/O) Module 305. I/O Module 305 may be utilized to provide an output to and receive input from a user (not shown). However, it will be understood the Apparatus 300 may be utilized without user intervention. In some exemplary embodiments, I/O Module 305 may be utilized to obtain inputs from a digital source, from a user, or the like. In some exemplary embodiments, I/O Module 305 may be used to output information, such as in a form of a computer-readable medium, as a printed report, as an output in a display, or the like.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps shown in FIG. 2.

In some exemplary embodiments, Memory Unit 307 may retain a Machine Learning Module 310 which, when executed by Processor 302, causes Processor 302 to predict an outcome of Program 360, to compare an executed outcome to a predicted outcome, to output a report describing the cause of a fail outcome, or the like. In some exemplary embodiments, Machine Learning Module 310 may utilize a data repository (not shown) which may be retained on Apparatus 300 or on a remote storage.

In some exemplary embodiments, Memory Unit 307 may retain a Program 360, such as EP 160 of FIG. 1. In some exemplary embodiments, Program 360 may be executed by a different apparatus than Apparatus 300 and may be potentially retained on the different apparatus.

In some exemplary embodiments, Memory Unit 307 may retain code, which, when executed by Processor 302, causes Processor 302 to display to a user, using a User Interface (UI), the information associated with a fail outcome determined by Apparatus 300, and/or the like.

An Embodiment

In some exemplary embodiments, a method for predicting failures of a computer program may be based on continuously learning a valid range of predefined set of attributes. A predictor may use a front end component that analyzes an input and extracts from it a vector of attributes with known types. The vector may be passed as an input to a Learner. In addition, the Learner may be provided with a Pass/Fail flag, indicating whether the predicted system accepted or rejected (i.e., failed on) this input. In some exemplary embodiments, the Learner may predict the expected pass/fail outcome and, in case of failure, identify a subset of attributes that caused it. Over time, the prediction may gradually become closer to the executed outcome, providing that the input is statistically stable.

In some exemplary embodiments, the structure (or format) of the input may be known, such as for example, TCP/IP message stream, an executable file of some known standard (e.g., Linux Executable and Linkable Format (ELF)), a source program written in some known language, or the like. A front end component configured to handle such inputs may comprise schemes of the inputs, referred here as an Input Scheme. The Input Scheme may be used to enable the front end to extract key attributes from the input. In some exemplary embodiments, these predefined attributes have known types, such as for example, a 32-bit integer, a null-terminated string, or an enumerated type. In some exemplary embodiments, the Learner automatically learns legal and invalid ranges of values of each attributes.

In some exemplary embodiments, the Learner may be a supervised machine learning system that may be configured for updating a training database with classified attribute vectors.

In some exemplary embodiments, a learning method may successively determine a range of values for each attribute together with their Pass/Fail classification. In some exemplary embodiments, upon analyzing the input by the Front End, an attribute vector ($V_i$) may be produced. In some exemplary embodiments, an attribute value can be either in Pass range, Fail range, or Out Of Range (OOR). In some exemplary embodiments, the Learner may determine a set of attribute values in $V_i$, that are Out Of Range (OOR)(V), and add those values to either pass ranges or fail ranges to comply with a new input.

In some exemplary embodiments, training input is processed. The Learner may discover, from the training input, ranges where the attribute vector $V_i$ passes, referred to as "Pass ranges", and ranges where $V_i$ fails, referred to as "Fail ranges".

In some exemplary embodiments, the attribute range may be updated based on executed outcome with respect to $V_i$. In case of a fail execution outcome, one or more of the attributes of $V_i$ is Out Of Range each of the attributes in OOR($V_i$) may be considered as an indication for failure. The cluster of Fail ranges may be extended to include one or more of the OOR($V_i$) attribute values. In some exemplary embodiments, The Fail range which is closest to the value of OOR($V_i$) may be extended and potentially may be considered as the cause of failure.

In some exemplary embodiments, the attribute range may be updated, if the executed outcome for $V_i$ is Pass. The cluster of attribute Pass ranges of each attribute in OOR(Vi)

may be extended to include the corresponding out of range value so it becomes within the Pass range value. Additionally or alternatively, the cluster of attribute Pass ranges of each attribute in a Fail range may be extended to include the corresponding Fail range value so it becomes within Pass range value instead of a fail range. Additionally or alternatively, the cluster of attribute fail ranges may be narrowed to exclude the attribute values that were added to pass ranges based on the executed outcome.

It should be noted that several clusters of attribute (Pass/Fail) ranges may be built, so that each range corresponds to either a Pass or a Fail outcome. The prediction, may be performed by choosing the cluster which may be closer to the input attribute vector and performs the prediction based on the outcome associated with this cluster. Additionally or alternatively, a Fail prediction may be provided in case one or more of the attributes of $V_i$ is in a fail range. Additionally or alternatively, Fail prediction may be provided in case one or more of the attributes of $V_i$ is in OOR. Additionally or alternatively, Pass prediction may be provided only in case all attributes of $V_i$ are in pass ranges. Additionally or alternatively, in case all attributes of $V_i$ are either in pass range or OOR, the prediction may be performed based on a distance measurement between the OOR and the corresponding pass and fail ranges, so that if for one OOR attribute its value is closer to a fail range than a pass range, the prediction may be a of a fail outcome.

In some exemplary embodiments, a training database may keep an internal representation of the classified attribute vectors and the corresponding Pass/Fail outcome. In some exemplary embodiments, one possible representation may be to keep clusters of attribute ranges, where each cluster is associated with either a Pass or a Fail indication. For example, in case of an input of Linux ELF executable files, the attribute may have a "Pass" cluster corresponding to valid 32-bit executables and a different "Pass" cluster corresponding to valid 64-bit executable files.

In some exemplary embodiments, the Front End may extract from the input a new attribute and notify the Learner about a new attribute. Following the notification the learner may instruct the training database to prepare a cluster of ranges for the new attribute. Additionally or alternatively, the learner may refer to the new cluster of ranges when predicting an outcome. It will be noted that the prediction may be based on the assumption that the Learner knows the structure of the new input, (e.g., set of attributes and their format). What it may not know is the actual values, and combination of the values, of the new attribute. In some exemplary embodiments, a new attribute value may be used then the values may be compatible with the definition of the Learner.

In some exemplary embodiments, a system in question (P) may be a tool that processes Linux ELF files (e.g., executable programs, shared libraries, etc.). The Input Scheme may define various attributes including Symbols and Relocations, such as for example: Symbol={Nameid, type, class, section, address}, the Nameid may be an index to some string table defined elsewhere in the file; Relocation={type, Nameid, offset}. In some exemplary embodiments, the compiler produces routinely ELF files with a known set of relocations that P can handle. In other words, the Learner may "know" the range of relocation types that P can handle correctly. Subsequently a new version of the compiler produces an ELF file with a new relocation type. The Front End may identify the new relocation type in the input as an OOR(Vi) for Vi=relocation type and may predict a failure which will indeed match the failure of P. A failure notice may be sent to the maintainer of P which eventually may fix P and release a new version of P. At that point the failure prediction of the Learner may be in mismatch with the actual result of P, since the fixed P may know how to handle the new type. This conflicting outcome may instruct the learner to extend the In-Range attribute of relocation type.

In some exemplary embodiments, the Input Scheme further defines a subclass of symbols whose names start with "_". Such symbols may be special symbols used by the system linker to indicate the beginning or end of some special section, (e.g., _END_OF_TEXT). If a new compiler version produces a new special symbol, named "_START_OF_LOCAL_THREAD_AREA", P may be aware of this and act accordingly. As in the previous case, in such case the current P will fail, matching the Failure indication of the Learner. As in the above case, the failure report will eventually result with a new version of P and an eventual extension of the class of the "_*" symbols.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    obtaining an input to be used by a program, wherein said obtaining is performed prior to executing the program with the input;
    predicting, based on the input, a predicted outcome of the program if the program is executed with the input, wherein said predicting is performed by a processor executing a machine learning module; wherein the predicted outcome is selected from the group consisting of: a pass outcome and a fail outcome, wherein the pass outcome is the program executing without failing when using the input, and wherein the fail outcome is the program failing when using the input.

2. The computer-implemented method of claim 1 further comprising:
    executing the program;
    determining an execution outcome of the program, wherein the execution outcome is selected from the group consisting of: the pass outcome and the fail outcome, wherein the execution outcome is different from the predicted outcome; and
    updating the machine learning module, wherein said updating is based on the input and the execution outcome.

3. The computer-implemented method of claim 2, wherein the machine learning module comprises a data repository configured to store inputs and an associated outcome for each input, wherein said updating the machine learning module comprises substituting the predicted outcome with the executed outcome in the data repository.

4. The computer-implemented method of claim 1, wherein the predicted outcome is the fail outcome, the method further comprises outputting the fail outcome.

5. The computer-implemented method of claim 4, wherein the input comprises a vector of attributes, wherein said outputting is outputting a subset of the attributes, wherein the subset is indicative of a cause of the fail outcome.

6. The computer-implemented method of claim 4, wherein said outputting is outputting to a developer of the program.

7. The computer-implemented method of claim 4, wherein said outputting is outputting to a user executing the program, the method further comprises executing the program in response to an instruction from the user.

8. The computer-implemented method of claim 1, wherein the predicted outcome is the fail outcome, the method further comprises avoiding executing the program in view of said predicting.

9. The computer-implemented method of claim 1, wherein the machine learning module is trained based on past execution outcomes.

10. A computerized apparatus having a processor, the processor being adapted to perform the steps of:
   obtaining an input to be used by a program, wherein said obtaining is performed prior to executing the program with the input;
   predicting, based on the input, a predicted outcome of the program if the program is executed with the input, wherein said predicting is performed by a machine learning module, wherein the predicted outcome is selected from the group consisting of: a pass outcome and a fail outcome, wherein the pass outcome is the program executing without failing when using the input, and wherein the fail outcome is the program failing when using the input.

11. The computerized apparatus of claim 10, wherein the processor is further adapted to perform the steps of: executing the program:
   determining an execution outcome of the program, wherein the execution outcome is selected from the group consisting of: the pass outcome and the fail outcome, wherein the execution outcome is different from the predicted outcome; and
   updating the machine learning module, wherein said updating is based on the input and the execution outcome.

12. The computerized apparatus of claim 11, wherein the machine learning module comprises a data repository configured to store inputs and an associated outcome for each input, wherein said updating the machine learning module comprises substituting the predicted outcome with the executed outcome in the data repository.

13. The computerized apparatus of claim 10, wherein the predicted outcome is the fail outcome, wherein the processor is further adapted to perform the step of outputting the fail outcome.

14. The computerized apparatus of claim 13, wherein the input comprises a vector of attributes, wherein said outputting is outputting a subset of the attributes, wherein the subset is indicative of a cause of the fail outcome.

15. The computerized apparatus of claim 13, wherein said outputting is outputting to a developer of the program.

16. The computerized apparatus of claim 13, wherein said outputting is outputting to a user executing the program, wherein the processor is further adapted to perform the step of executing the program in response to an instruction from the user.

17. The computerized apparatus of claim 10, wherein the predicted outcome is the fail outcome, wherein the processor is further adapted to perform the step of avoiding executing the program in view of said predicting.

18. The computerized apparatus of claim 10, wherein the machine learning module is trained based on past execution outcomes.

19. A computer program product comprising a computer readable storage medium retaining program instructions, which program instructions when read by a processor, cause the processor to perform a method comprising:
   obtaining an input to be used by a program, wherein said obtaining is performed prior to executing the program with the input;
   predicting based on the input, a predicted outcome of the program if the program is executed with the input, wherein said predicting is performed by a machine learning module, wherein the predicted outcome is selected from the group consisting of: a pass outcome and a fail outcome, wherein the pass outcome is the program executing without failing when using the input, and wherein the fail outcome is the program failing when using the input.

* * * * *